United States Patent [19]

Hsia et al.

[11] Patent Number: 4,685,123

[45] Date of Patent: Aug. 4, 1987

[54] COMMUNICATION SYSTEM HAVING VOICE AND DATA CAPABILITY

[75] Inventors: Richard Y. Hsia, Holmdel; Thomas C. Liu, Atlantic Highlands, both of N.J.

[73] Assignees: American Telephone and Telegraph Company, New York, N.Y.; AT&T Information Systems Inc., Morristown, N.J.

[21] Appl. No.: 775,742

[22] Filed: Sep. 13, 1985

[51] Int. Cl.⁴ ............................................. H04M 11/00
[52] U.S. Cl. ........................................ 379/93; 379/94; 379/98; 379/109
[58] Field of Search .................. 179/2 C, 2 DP, 18 C; 375/5; 379/93, 94, 97, 98, 104, 109, 377

[56] References Cited

U.S. PATENT DOCUMENTS

| | | | |
|---|---|---|---|
| 3,597,544 | 8/1971 | Kennedy | 179/2 |
| 3,803,360 | 4/1974 | Morstadt | 179/2 DP |
| 3,997,736 | 12/1976 | Gorman, II | 179/18 C |
| 4,288,662 | 9/1981 | Fahrenschon | 179/2 DP |
| 4,291,200 | 9/1981 | Smith | 179/18 BD |
| 4,306,116 | 12/1981 | McClure et al. | 179/2 DP |
| 4,392,023 | 7/1983 | Sears | 179/2 DP |
| 4,421,951 | 12/1983 | Van Bosse | 179/2 DP |
| 4,488,002 | 12/1984 | Seibel | 179/2 DP |
| 4,503,288 | 3/1985 | Kessler | 179/2 DP |
| 4,524,244 | 6/1985 | Faggin et al. | 179/2 DP |
| 4,596,021 | 6/1986 | Carter et al. | 375/5 |

*Primary Examiner*—Gene Z. Rubinson
*Assistant Examiner*—Matthew E. Connors
*Attorney, Agent, or Firm*—John A. Caccuro

[57] ABSTRACT

A communication system includes a plurality of station sets each connected over two pair communication facilities to a control module. An adapter unit switchably connects an external data or voice device via a station set to either facility in response to a control signal from the control module. A data mode is established by sending a data mode request signal from the station set to the control module. An off-hook signal from a connected data device is used to request a data call. The control module signals to which facility the adapter is to connect the data call and outputs a unique visual on the data call facility. The control module prevents other calls from bridging onto or interfering with the data call. The system also permits a voice call on a facility to be converted to a data call on the other facility. Furthermore, a user can make a voice call over one facility while a data call is in progress on the other facility.

9 Claims, 6 Drawing Figures

FIG. 6

601 — TRANSLATION TABLE

| | DATA MODE | |
|---|---|---|
| STATION 120 | 0 | |
| ⋮ | ⋮ | |
| STATION 129 | 1 | |

602 — CALL RECORD TABLE

| | CALLING STATION | CALLED STATION | OTHER STATIONS | CALL FACILITY | CALL TYPE |
|---|---|---|---|---|---|
| CALL Z1 | 129 | — | — | 111 | DATA |
| ⋮ | | | | | |
| CALL ZN | | | | | |

COMMUNICATION SYSTEM HAVING VOICE AND DATA CAPABILITY

1. Field of the Invention

This invention relates to telephone communication systems in general and, in particular, to a telephone communication system having station sets having simultaneous voice and data communication capability.

BACKGROUND OF THE INVENTION

Modern telephone systems increasingly offer a data communication capability. Typically, this data capability is provided by dedicating a separate system port for each connection of a modem or a data set, thereby reducing the number of system ports available for voice communications.

One prior communication system enables the user to connect a modem through a station set and substitute data communication for voice communications thereat. In that system each station set is connected to a control module over a two pair communication facility in which dialed voice or data connections can only be made over one pair, the other pair being used for receive only voice communications or for two-way voice communications if a voice adjunct is connected to a port of the station set. When a data call, over a modem connected to the station set port, is made over the first pair, it prevents the station set from establishing a concurrent voice call over the second pair. What is desired is a method and apparatus for enabling station sets to concurrently establish both a data call and a voice call.

SUMMARY OF THE INVENTION

A communication system having a plurality of station sets each connected over a two pair communication facility to a control module is adapted to enable a user to program each station set for either simultaneous voice/voice or voice/data communications over the two pairs. Each station set is adapted or initiating calls and transmitting and receiving voice and data signals over the first communication pair and for only receiving voice and data signals over said second communication pair.

According to the present invention, a general purpose adapter (GPA) unit switchably connects an external device (a data modem or a voice module) to either first communication pair V1 or second communication pair V2 of a general purpose port of a station set in response to a control module signal. When a data call is desired the user connects a data modem to the GPA and sends a data mode request signal to the system control module. The data mode request signal is generated at a station set by entering a station programming mode and depressing a message button. The control module establishes the data mode in response to the data mode request signal and sends a visual signal to the station set indicating that the data mode is established.

Once a station set is in the data mode, an off-hook signal received from the station set causes the control module to send a control signal for establishing a data call connection between GPA and pair V2. The pair V1 is then made available for a subsequent voice call. The control module sends a unique visual to the station set involved in the data call and prevents other users from bridging or interfering with the data call. If a station set is not in the data mode, an off-hook signal thereat causes the control module to send a control signal for establishing a voice call connection between GPA and pair V1. According to another aspect of the present invention, a voice call established on pair V1 during the data mode is converted to a data call over pair V2 by going off-hook at the modem.

BRIEF DESCRIPTION OF THE DRAWING

The characteristics and operation of the present invention will be more apparent from the following detailed description taken in conjunction with the drawings in which:

FIG. 6 shows tables useful in understanding the flow charts.

DETAILED DESCRIPTION

In the following description, elements of each figure have reference designations associated therewith, the first number of which refers to the figure in which that element is located (e.g., 100 is located in FIG. 1).

Figure 1:
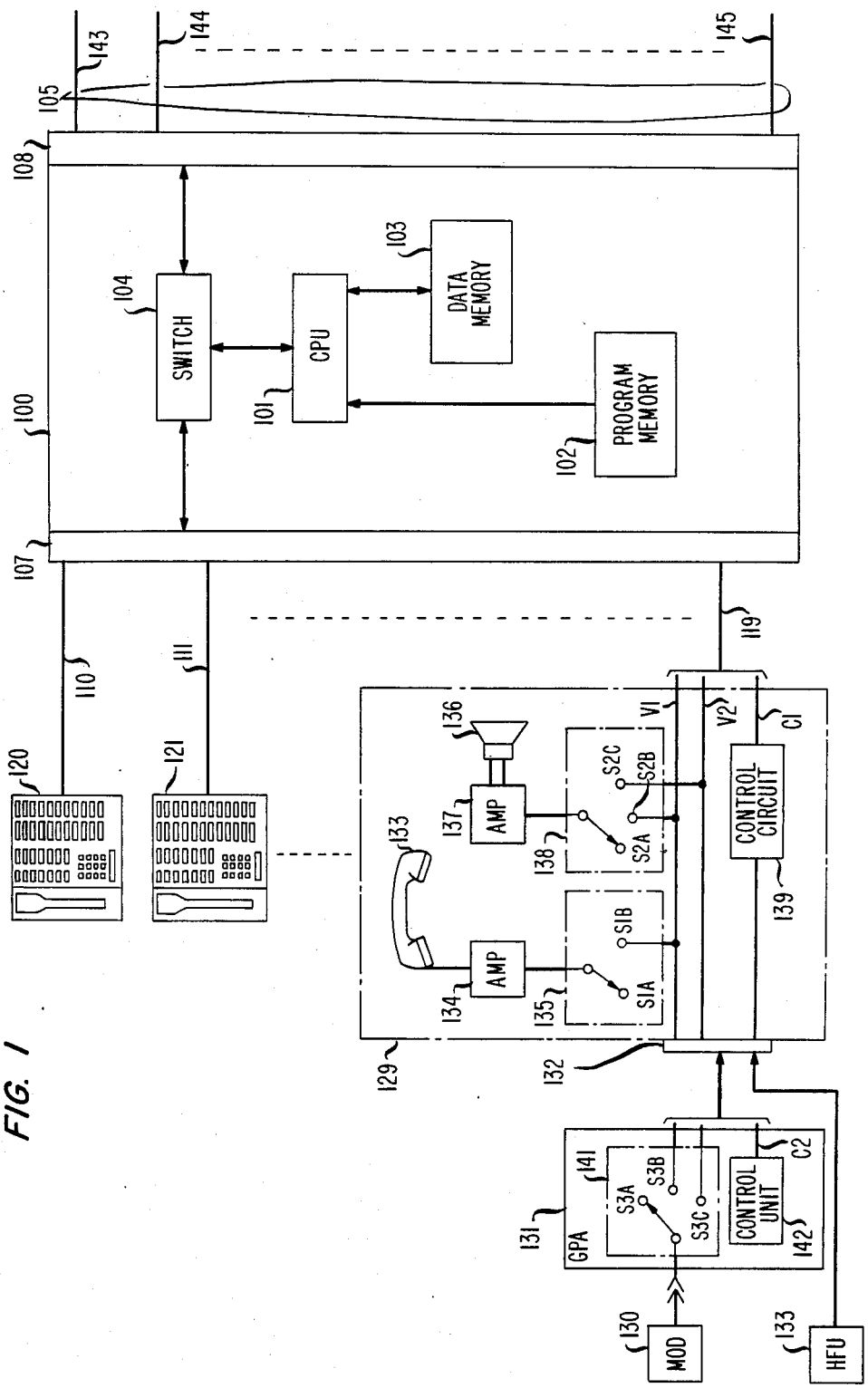
FIG. 1 is a block diagram of a telephone communication system useful for describing the present invention.

Shown in FIG. 1 is an illustrative block diagram of a communication system useful for describing the operation of the present invention. The system includes common control module or unit 100 which connects to one or more central office (CO) or PBX lines 105 via interface 108, and which connects via interface 107 and cables 110–119 to two or more station sets, such as 120–129. A data device, such as modem 130, connects to a station set 129 via a general purpose adapter (GPA), such as 131. The GPA connects to general purpose port 132 located on station set 129. Alternatively, hand free answer unit 133 may also connect via port 132 to station set 129.

The general operation of the communication system shown in FIG. 1 is as follows. Control unit 100 establishes and controls all intercom and CO or PBX line communications. Control unit 100 includes switch 104, central processor unit (CPU) 101, program memory 102 and data memory 103. Program memory 102 provides instructions to CPU 101 for controlling switch 104 and interface units 107 and 108 to enable the various operating features and functions of the system. Data memory 103 is utilized by CPU 101 for storing and accessing data associated with performing the various functions and features programmed in program memory 102. In a preferred embodiment CPU 101 is a microprocessor, program memory 102 is read-only-memory (ROM), and data memory 103 is random access memory (RAM). The interface circuits 107 and 108 may include well known circuitry such as ring detector, switching matrix, network control, line circuits, and other circuitry required by the system to establish, maintain and terminate communications. One communication system which may embody the present invention utilizes interchangeable program cartridges to supplement program memory 102 and data memory 103, and is described in U.S. Pat. No.4,506,346 filed by Bennett et al and issued on Mar. 19, 1985, which description is incorporated by reference herein.

Before proceeding with the operating description of the present invention, it should be recognized that the present invention may be utilized in other telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the block diagrams and flow charts of FIGS. 1-5 and the tables of FIG. 6 which describe the logical steps and the various parameters required to implement the present invention.

Shown as part of FIG. 1 is a functional block diagram of a station set 129 which operates under control of control unit 100. Station set 129 connects to control unit 100 via cable 119 which includes the facilities voice pair V1, voice pair V2 and control pair C1. Station set 129 includes a handset 133 which may be connected via amplifier circuit 134 and switch 135 to voice pair V1. The station set 129 also includes a speaker 136, amplifier 137 and switch 138, which enables connection to voice pair V1, voice pair V2 or neither. Switches 135 and 138 operate under control of control circuit 139 which receives control signals from and outputs station status signals to control unit 100 via control pair C1.

Figure 2:
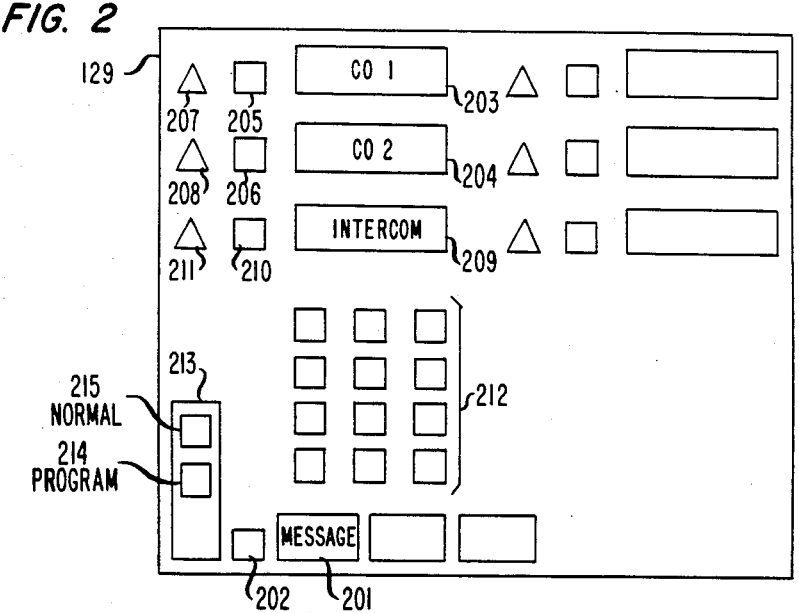
FIG. 2 shows an illustrative button arrangement of a station set which may be utilized with the system of FIG. 1.
Figure 3:
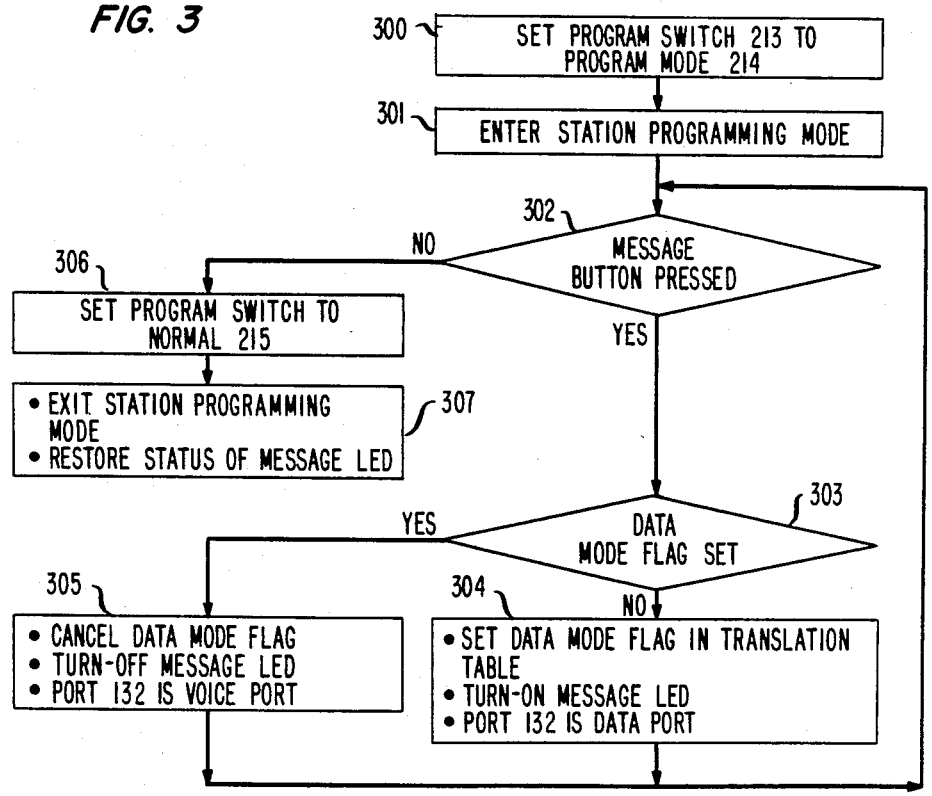
FIG. 3 shows a flow chart for initialization of the data mode of operations.

The GPA 131 includes a control unit 142 which is responsive to control signals received from control unit 100 over C2 for switchably connecting an external device such as modem 130 to voice pair V2 or voice pair V1. Shown in FIG. 2 is an illustrative button arrangement of a station set which may be utilized with the communication system shown in FIG. 1. The station set includes a Message button 201 with an associated green LED 202; CO line buttons 203, 204 with associated green LEDs 205, 206 and red LEDs 207, 208; and intercom button 209 with associated green LED 210 and red LED 211; and other buttons and LEDs which may provide features and functions not relevant to the present invention. The key pad 212 provides dialing capability for station set 129. Program switch 213 has a program position 214 and a normal position 215.

Returning to FIG. 1, the prior art communication system described in the previously-referenced Bennett et al patent did not include modem 130 or GPA 131. HFU 133 or a speakerphone (not shown) could only connect to voice pair V2 via port 132. Data calls required a modem acoustically connected to voice pair V1 via handset 133 or connected directly to voice pair V1 in substitution for station set 129.

The operation of the prior art control unit 100 and station sets 120-129 of the communication system shown in FIG. 1 is such that control circuit 139 of station 129 receives control signals over control pair C1 and transmits control signals to control unit 142 of GPA 131 over lead C2. Control circuit 139 has complete signaling control over voice pair V1 and incomplete signaling control over voice pair V2. That is, only on-hook and off-hook (switch hook) signaling is available for voice pair V2 while signaling circuit 134 provides complete signaling including line selection, dialing and switch hook signaling for voice pair V1. Hence a call can only be initiated on voice pair V1 and not on voice pair V2. A typical well-known operation for establishing a voice call by a user at station set 129 proceeds as follows. When station set 129 is idle, with no voice or data call active, switch 135 is in position S1A and switch 138 is in position S2A. Switch 141 in GPA unit 131 is in position S3A. When a user goes off-hook to originate a voice call on a CO line (e.g., 203 of FIG. 2) or a intercom line (e.g., 209 of FIG. 2), switch 135 connects handset 133 and amplifier 134 via contact S1B to voice pair V1 while switch 138 is unchanged. The user proceeds to dial the called station number and control circuit 139 and the signals to control unit 100 to establish a connection over voice pair V1.

During this voice call (on voice pair V1) the user at station set 129 may receive a voice call on another line. Another party could answer that call and then dial the user at station set 129, over an intercom line via voice pair V2, and tell him or her of the second call. Control unit 100 receives this dial signal prepares a voice connection over voice pair V2 and sends a control signal over control pair C1 to station set 129. In response to the control signal, control circuit 139 causes switch 138 to connect speaker 186 via contact S2C to voice pair V2. The user at station set 129 then receives a voice message concurrently over voice pair V2 with the existing call on voice pair V1 being undisturbed.

If a data call is desired, the prior art operation of the communication system shown in FIG. 1 would include a modem 130 connected through an adapter (not shown) to voice pair V1 via port 132. This adapter, however, did not permit access to voice pair V2. The call operation of this arrangement would proceed as follows. The data user at station set 129 would go off-hook at handset 133 and dial a connection over voice pair V1, as with a voice call. When a carrier signal is received the user connects modem 130 through port 132 to voice pair V1. The user would then go on-hook at handset 133. At the conclusion of the data call either modem 130 or the other party would go on-hook to terminate the data call.

During the data call the communication system gives a busy indication to all calls to station set 129. However, other users could interfere with such a call by attempting a conference connection thereto. The user at station set 129 could receive a voice message over voice pair V2 via speaker 136 in a manner analogous to that described in the prior paragraphs. Since modem 130 is connected to port 132, HFU unit 133 could not also be connected to station set 129 and, hence, no two-way communications could exist over voice pair V2. Moreover, the user would not be able to converse with the calling party using handset 133 since it connects only to voice pair V1 and not to voice pair V2. Thus, according to the prior art operation of the communication system of FIG. 1, when station set 129 had a two-way data call in progress (over voice pair V1) it could not have a two-way connection over voice pair V2.

In accordance with the apparatus and method of the present invention a GPA 131 is added and the operation of control unit 100 and station set 129 are adapted to enable the user to establish simultaneous two-way voice and data calls at station set 129. According to the present invention, before station set 129 may be used for a data only call or a simultaneous voice/data call, it signals a data mode request signal to control unit 100. To signal the request to control unit 100, the user enters the station program mode by setting the program switch 213 to the program position 214. During the program mode the user can program various feature capabilities to station set 129.

With joint reference to FIGS. 1, 2, 3 and 6, after the station program mode is entered, (step 301) by operating the station program switch (step 300), on station set 129, the user then presses the Message button, 201, during step 302. The Message button activation is recognized by the system as a data mode request signal and the system checks (step 303) if the data mode flag is set for that station in table 601 (e.g., no data mode flag is set for station 120). In response to the data mode request, if the mode flag is not set, control unit 100 makes an entry (step 304) in translation table 601 indicating that station set 129 has the Data mode activated. This indicates to control unit 100 that the general purpose port 132 is connected via GPA unit 131 to modem 130 rather than to a voice unit, such as HPU unit 133. Control unit 100 then sends a data mode indication signal which causes the LED 202 associated with Message button 201 to illuminate, confirming and displaying to the user that the Data mode has been entered. Note, if the mode flag is set for a station set and the message button 201 is pressed, control unit 100 cancels the data mode flag and turns off the message LED. Hence, if a user wants to return or cancel the Data mode the Message button 201 is pressed again (step 302) and the system toggles back to the Voice mode while remaining in the program mode. Otherwise the user sets the program mode switch (213) to the normal position 215 (step 306), causing station set 129 to remain in the Data mode after the program mode is exited (step 307) and the message LED is restored to a condition it was before the program mode was entered. Thus, the station set operating mode depends on the mode the station set is in when program switch 213 is returned to the normal position. While the Data mode is described as being established by operations at station set 129 it is contemplated that the Data mode could also be established in other ways, e.g., using other combinations of button operations or by a centralized system administration terminal.

Figure 4:
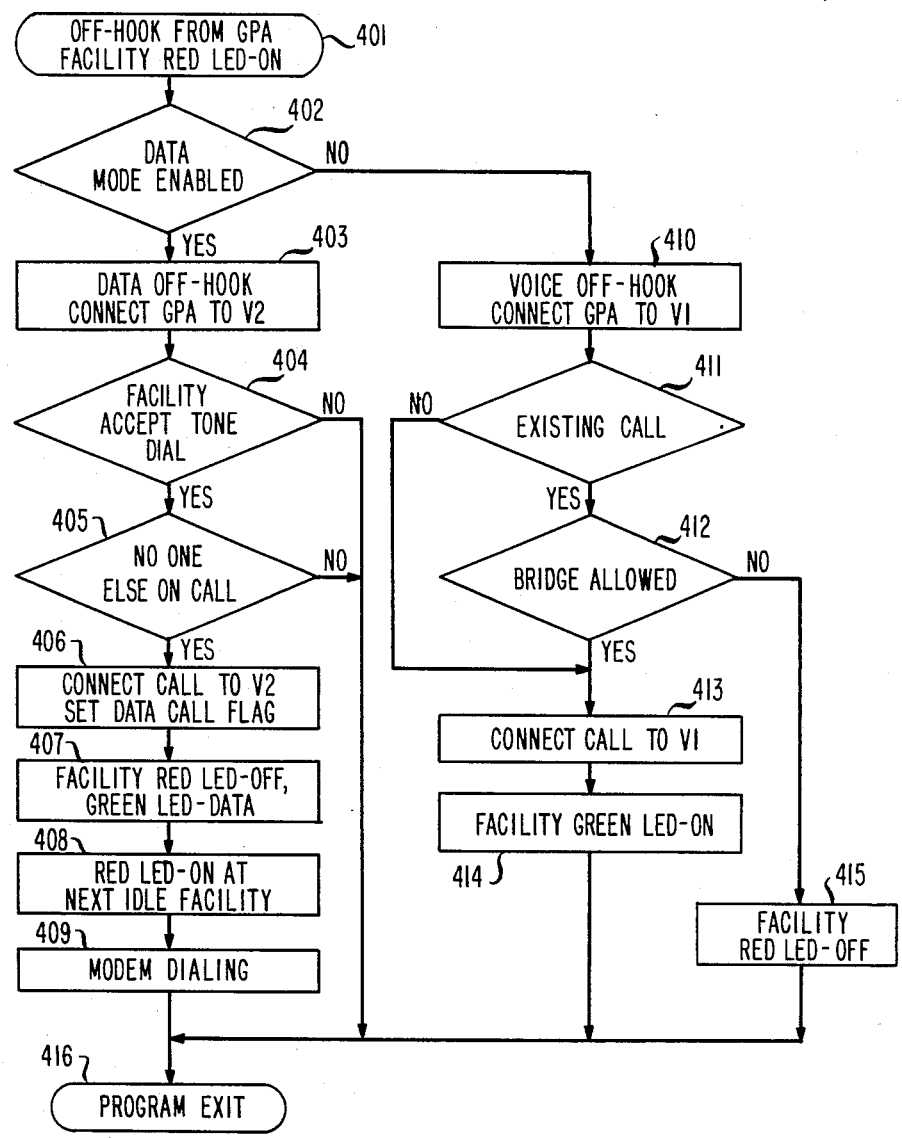
FIG. 4 shows a flow chart for establishing a data call.

With joint reference to FIGS. 1, 2, 4 and 6 and assuming that station set 129 has been programmed for the Data mode, the further operation of the present invention is described. FIG. 4 assumes that there is not an active call at station set 129. In step 401, when a user desires to make a data call he or she goes off-hook at GPA 131. This sends a data off-hook signal to control unit 100 indicating a data call request. The user can select which facility (CO line or intercom line) at which to go off-hook or control unit 100 will select a CO line for the user. The red LED associated with the selected facility is turned-on.

In step 402, control unit 100 checks translation table 601 to determine if a Data mode has been activated for station set 129. If the Data mode is active, step 403, then the off-hook from GPA 131 is a data off-hook and GPA 131 is connected to voice pair V2. In step 404, since control unit 100 knows that modem 130 has touch-tone dialing capability it connects it directly to a tone capable CO line. Because control unit 100 knows that the Data mode is activated, it does not attempt to connect modem 130 to a non-touch tone facility, such as the intercom facility. If no tone facilities are available the program exits at step 416 and the status of the green LED associated with the selected facility does not change indicating this lack of a tone facility to the user at station set 129.

In step 405 the program checks if any other party if active on this call (e.g., has this user attempted to bridge the GPA 131 onto an existing call), since conference data calls are meaningless in this system. If another party is active the program exits at step 415. Thus, the system inhibits any connection to the data call by preventing a user at any station set from selecting a button of a CO line having an active data call thereon. Moreover, in this data privacy mode, control module 100 prevents any actions at any other station set, including the station sets connected to the data call, from interfering with the existing data call. This data privacy feature is similar to the voice privacy feature which prevents intrusions onto existing voice calls.

If no one else is active on the call then a data call is established, 406, between modem 130 and voice pair V2. A data call flag is set in call record table 602 indicating, illustratively, that the call designated as Z1 is a data call on station set 129 which uses facility 143. In step 407 the red LED of the CO line button (e.g., 205), which was turned-on in step 401, is now turned-off and the green LED (e.g., 207) associated with that CO line button is turned-on to a unique interrupted flutter condition (LED-DATA), indicating that data call is active. This interrupted flutter signal is a visual data call confirmation signal given to the user. The interrupted flutter condition occurs at a rate which is distinguishable from all other visual signals given by the station LEDs. Note that during an active data call the green LED of the CO line button flutters only at the station or stations active on that data call. Hence, the green LED for the CO line appearance at all other station sets is turned-on but does not have the interrupted flutter signal.

Since the connection of the data call is completed the station appears idle again in step 408 and the red LED is turned-on at the CO line selected to be the next idle line by the idle line preference circuit. In step 409 modem dialing signals can be sent over pair V2. The program then exits in step 415. A data call termination procedure will be discussed in a later paragraph.

Returning to step 402, if the Data mode was not enabled the system treats the request as a voice off-hook and, in step 410, GPA 131 or HFU 133 is connected to voice pair V1. In step 411, if there is an existing call on voice pair V1, the program checks, in step 412, if station set 129 can be bridged onto that call. If so then station set 129 is connected to the call in step 413, if not then, in step 415, the red LED is turned-off indicating that the user cannot use the selected facility at this time. In step 411 if there is no existing call or in step 412 if the bridging of the call is permitted then station set 129 is connected, in step 413, via voice pair V1 to the CO line of the call. In step 414, control unit 100 turns-on the green LED for the CO line button associated with the call to indicate an active call on that CO line. The program exits after steps 415 or 414 indicating the completion of the off-hook condition at GPA 131.

Note, if station set 129 was idle and an off-hook from handset occurred, i.e., a typical voice call, the sequence of steps 410 through 415 would occur exactly as described above except that the handset 133 rather than GPA 131 would be connected to voice pair V1 in step 410. This is accomplished by a station control signal sent to the station set 129 from control module 100.

A data call termination occurs in one of two ways. The called party can terminate a call by dropping the carrier tone causing modem 130 to go on-hook. When the control unit 100 detects a disconnect signal from a CO line (e.g., 143) it assumes that the modem 131 has failed to hang-up (since the CO call is being terminated) and proceed to tear down the call, thus freeing the CO line. However, the modem 131 must still hang-up on its own, since control unit 100 has no control over the secondary switch hook operation on voice pair V2.

The user at station set 129 can also terminate the call by going on-hook at modem 130. Control unit 100 detects the on-hook signal and terminates the data call in the same manner that a voice call is terminated. At station set 129 the red and green LEDs are turned-off at the CO line button on which the call had been present.

Figure 5:
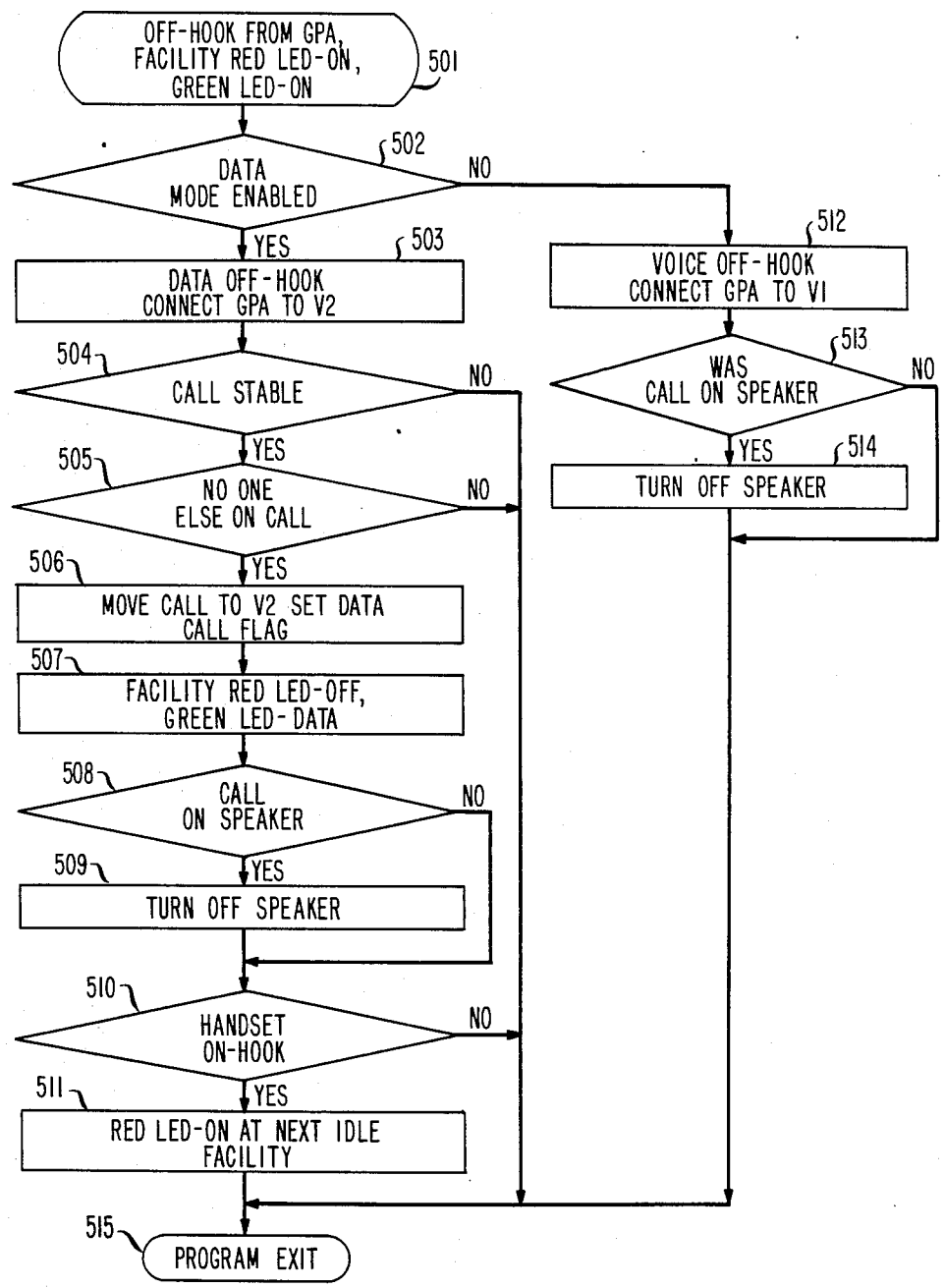
FIG. 5 shows a flow chart for converting a voice call to a data call.

With joint reference to FIGS. 1, 2, 5 and 6 the operation of providing a concurrent voice and data call in accordance with the present invention is described. Generally the operation of FIG. 5 is such that any off-hook of the secondary switch hook (i.e., for voice pair V2) at a station having an active Data mode is assumed to be from modem 130 and thus seizes voice pair V2. Assume that the user is already active on a voice call, a further assumption is made that the user wants to convert this voice call into a data call. Thus, the off-hook modem 130 grabs the call away from handset 133 or the speaker 136, shutting off speaker 136 if the call was there. The green LED next to the facility button associated with the data call gets a unique indication; an interrupted flutter signal.

For the duration of a data call, absolutely no user in the system may go off-hook to bridge onto this call. Furthermore, attempts to preselect or post-select the facility button of the active data call from this station are denied.

When the data session ends, it is expected that the modem 130 would hang-up the secondary switch hook automatically when it detects the loss of data carrier; otherwise, the user must cause the modem to go on-hook. Or, if the data call is through a CO line and the CO signals a disconnect, the system disconnects the call; but the modem itself still must go on-hook.

FIG. 5 assumes that station set 129 has an active voice call on voice pair V1 and, hence, the facility red LED-ON and green LED-ON. In step 501 GPA 131 goes off-hook. In step 502 the program checks translation table 601 for station set 129 to determine whether the Data mode is enabled. If enabled the system assumes a data call is requested and connects GPA 131 to voice pair V2 (i.e., switch 141 connects to S3C) in step 503. Since the user is already active on a call, the system assumes that the user wants to convert this voice call into a data call which occurs on voice pair V2.

In step 504, the system checks if the voice call is stable. An unstable call is an incompleted intercom call (i.e., one not yet answered, busy signal, error signal, dial tone, or with incomplete dialing) or dial access call (i.e., one which have yet to be completed). If the call is not stable, the call conversion request (voice-to-data call conversion) should be denied, since the voice call has not fully been converted. Doing this enables the voice call on voice pair V1 to be completed prior to being converted to a data call on voice pair V2. Thus, if the existing call is not stable the program exits in step 515.

If the existing call is stable the program checks if someone else is on the call in step 505. If someone else is on the call the program exits in step 515, since the system does not permit conference data calls. If no one else is on the voice call, in step 506, the voice call on voice pair V1 is moved to voice pair V2 and converted into a data call. The call type entry in the call record table 602 is changed accordingly to reflect this change. In step 507, control unit 100 turns-off the red LED and turns-on the green LED associated with the active CO line button to an interrupted flutter state. In step 508, if the voice call is using speaker 136 the speaker is disconnected (step 509) otherwise proceed to step 510. In step 510, if handset 133 was off-hook, control unit disconnects handset 133 leaving it dead. In step 511, since station set 129 is now idle, program performs idle line preference and turns-on the red LED next to the next idle CO line which is to be selected when station set 129 goes off-hook. Thereafter, the program exits in step 515.

Returning to step 502, if the Data mode is not enabled the off-hook signal from GPA 131 cannot represent a data call but is a voice off-hook signal. Hence, GPA 131 or HFU 133 is connected to voice pair V1 in step 512. In step 513, the program checks if speaker 136 is connected, if so the speaker 136 is disconnected, in step 514. The program exits in step 515 after determining that speaker 136 was off, step 513, or after turning-off speaker 136 in step 514.

While the disclosed system was described as including station sets having LED visual displays it obviously could be adapted for operation with station sets utilizing digital displays. Additionally, GPA can be designed to be part of the station set without deviating from the present invention.

Thus, what has been described is merely illustrative of the application of the principles of the present invention. Other methods, sequences or circuits can be used to implement the present invention by those skilled in the art without departing from the spirit and scope of the present invention.

What is claimed is:

1. A communication system comprising a control module for controlling the communications of a plurality of station sets each connected over a first and a second facility pair to said control module, one of said station sets being adapted for initiating calls and transmitting and receiving voice and data signals over said first facility pair and for only receiving voice and data signals over said second facility pair, said system further comprising adapter means connected to said one of said station sets and including means for switchably connecting an external device to said first or second facility pair in response to a control signal;

said one of said station sets including means operably by a user for signaling a data mode request signal to said control module to request a data operating mode, means for displaying a data mode signal received from said control module indicating when said data mode is established; and means for sending an off-hook signal to said control module indicating a call request; and said control module including means responsive to said data mode request signal for establishing said data mode and for sending said data mode signal to said one of said station sets and means responsive to said off-hook signal for sending said control signal to said connecting means for establishing a data call connection between said adapter means and said second facility pair during said data mode and for establishing a voice call connection between said adapter means and said first facility pair in the absence of said data mode.

2. The communication system of claim 1 wherein said data mode request signaling means includes two predetermined switching devices on said station set which are successively operated to signal a request for said data mode.

3. The communication system of claim 1 wherein said data mode request signaling means includes a station set button not dedicated to said data mode and wherein said displaying means is associated with an operational mode status of said station set button.

4. The communication system of claim 1 wherein said control module includes means for inhibiting a connection of another station set to said data call.

5. The communication system of claim 1 wherein said station set further includes display means associated with a facility pair on which said adapter means has gone off-hook for displaying a unique visual signal indicating said data call.

6. The communication system of claim 1 wherein successive operations of said data mode request signaling means toggle the system between said data mode and a voice mode.

7. The communication system of claim 1 wherein said station set further includes means for signaling a voice off-hook signal to said control module during said data call connection on said second facility pair indicating a voice call request from said station set over said first facility pair and wherein said control signal sending means sends a station control signal to said station set enabling a voice call connection between said station set and said first facility pair in response in said voice off-hook signal.

8. The communication system of claim 1 wherein said control module further includes means responsive to a data off-hook signal from said adapter means occurring during said voice call connection for converting said voice call connection on said first facility pair to a data call connection on said second facility pair.

9. A method of providing a voice and data calls in a communication system comprising a control module for controlling the communications of a plurality of station sets each connected over a first and a second facility pair to said control module, one of said station sets operable for initiating calls and transmitting and receiving voice and data signals over said first facility pair and operable for only receiving voice and data signals over said second facility pair, the method comprising the steps of:

switchably connecting an external device via an adapter means to said first or second facility pair in response to a control signal;

under direct control by a user at a station set, signaling a data mmode request signal to said control module requesting a data operating mode;

establishing said data mode at said control module;

sending a data mode signal to said station set from said control module;

at said station set, displaying said data mode signal received from said control module indicating that said data mode is established;

sending an off-hook signal from said station set to said control module indicating a call request;

sending said control signal to said adapter means during said connecting step for establishing a data call between said adapter means and said second facility pair during said data mode and for establishing a voice call between said adapter means and said first facility pair in the absence of said data mode.

* * * * *

UNITED STATES PATENT AND TRADEMARK OFFICE
CERTIFICATE OF CORRECTION

PATENT NO. : 4,685,123

DATED : August 4, 1987

INVENTOR(S) : Richard Y. Hsia, Thomas C. Liu

It is certified that error appears in the above-identified patent and that said Letters Patent is hereby corrected as shown below:

Column 1, line 40, "or" should read --for--.

Column 4, line 24, "186" should read --136--.

Column 8, line 50, "operably" should read --operable--.

Column 9, line 24, "a voice" should read --voice--.

Column 9, line 32, "in" should read --to--.

Column 10, line 5, "a voice" should read --voice--.

Column 10, line 19, "mmode" should read --mode--.

Signed and Sealed this

Nineteenth Day of December, 1989

*Attest:*

JEFFREY M. SAMUELS

*Attesting Officer*  *Acting Commissioner of Patents and Trademarks*